United States Patent [19]

Malone

[11] Patent Number: 5,685,199

[45] Date of Patent: Nov. 11, 1997

[54] PUSH-PULL CONTROL WITH OPPOSING COLLET ADJUSTMENT II

[75] Inventor: David Malone, Lapeer, Mich.

[73] Assignee: Teleflex Incorporated, Plymouth Meeting, Pa.

[21] Appl. No.: 642,160

[22] Filed: May 2, 1996

[51] Int. Cl.$^6$ ........................................ F16C 1/10
[52] U.S. Cl. ...................... 74/502.4; 74/502.6; 403/374
[58] Field of Search ........................... 74/502.4, 502.6, 74/500.5, 501.5 R; 403/374, 373

[56] References Cited

U.S. PATENT DOCUMENTS

| | | |
|---|---|---|
| 3,781,908 | 12/1973 | Tullos . |
| 3,952,377 | 4/1976 | Morell . |
| 5,039,138 | 8/1991 | Dickirson ........................ 74/502.6 |
| 5,265,493 | 11/1993 | Solano et al. ................ 74/501.5 R |
| 5,265,494 | 11/1993 | Gabas et al. ................. 74/501.5 R |
| 5,383,377 | 1/1995 | Boike .............................. 74/502 |
| 5,536,103 | 7/1996 | Sawada ......................... 403/374 |
| 5,575,180 | 11/1996 | Simon ........................... 74/502.4 |

FOREIGN PATENT DOCUMENTS

| | | | |
|---|---|---|---|
| 204180 | 11/1956 | Australia ................... 403/374 |
| 0460839 A1 | 12/1991 | European Pat. Off. ........... 74/502.6 |
| 1207292 | 2/1960 | France ...................... 74/502.4 |
| 687525 | 1/1940 | Germany ..................... 403/374 |
| 2236702 | 1/1981 | Germany ..................... 403/374 |

*Primary Examiner*—Vinh T. Luong
*Attorney, Agent, or Firm*—Howard & Howard

[57] ABSTRACT

A motion transmitting remote control assembly (10, 10') of the type for transmitting motion in a curved path by a motion transmitting core element and including an adjustment mechanism for adjusting the length of either the conduit (14) or the core element (12) along the longitudinal axis. The adjustment mechanism includes a fitting member (26), opposed and radially outwardly tapered conical sections (16) are disposed within the fitting member (26), and a pair of ramp collets (18) are normally in wedging engagement with the conical sections (16) for radial expansion into engagement with the fitting member (26) to create radial binding forces between the conical sections (16) and the fitting member (26) to prevent axial movement of the fitting member (26) relative to the conical sections (16) along the longitudinal axis in an adjusted fixed position. The collets (18) are axially movable relative to the conical sections (16) to a release position for releasing the radial binding forces to allow the fitting member (26) to be moved axially relative to the conical sections (16) along the longitudinal axis. Tabs (34) support posts (38) which extend radially into grooves (36) in the collets (16) for disengaging the gripping engagement to allow axial adjustment.

13 Claims, 3 Drawing Sheets

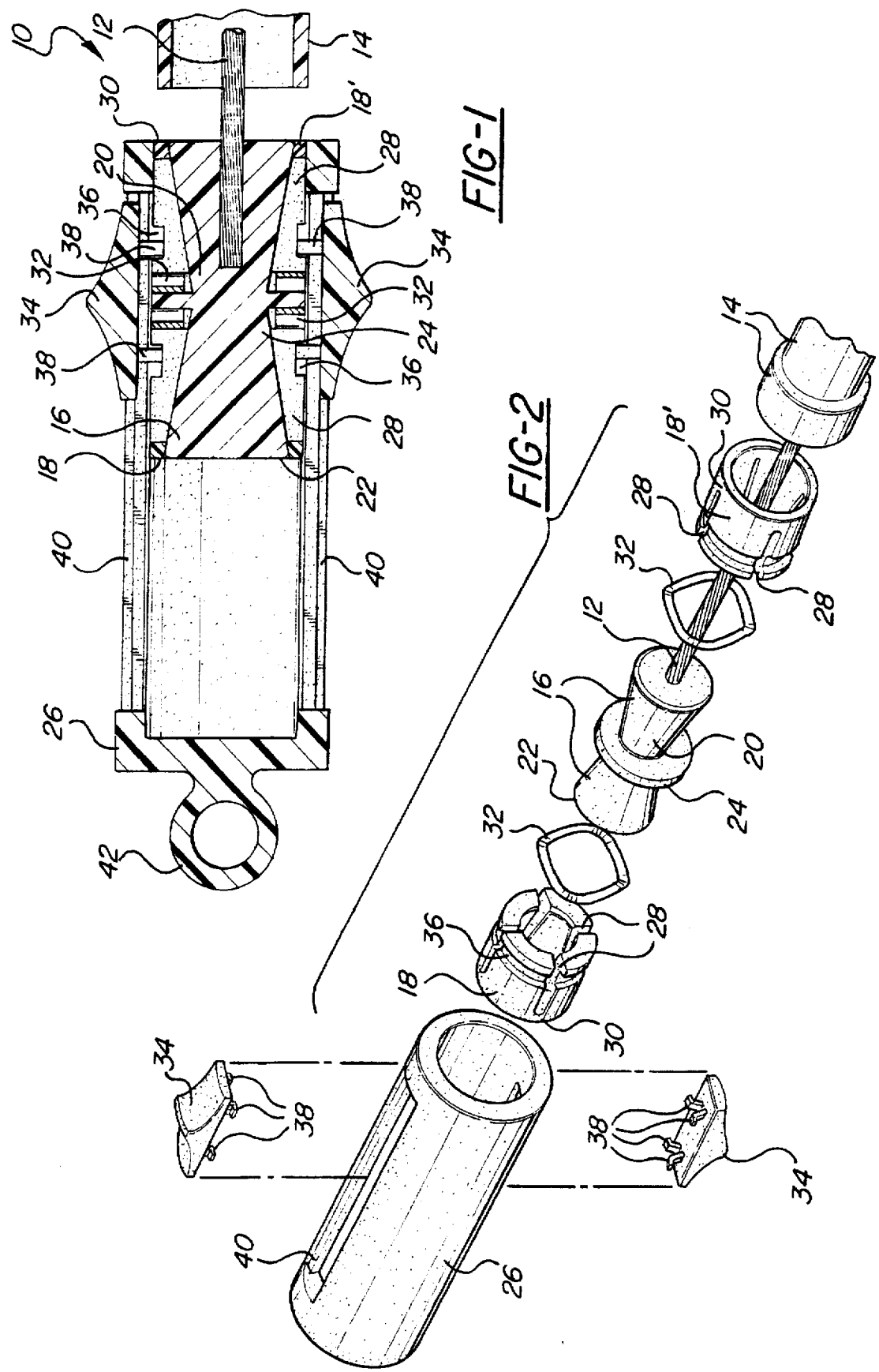

5,685,199

PUSH-PULL CONTROL WITH OPPOSING COLLET ADJUSTMENT II

BACKGROUND OF THE INVENTION

1. Field of the Invention

The subject invention relates to motion transmitting remote control assemblies of the type for transmitting motion in a curved path by a flexible motion transmitting core element moveably supported in a conduit.

2. Description of the Prior Art

The assemblies to which the subject invention relates are used extensively in the automotive industry. Typically, such a control assembly is routed through the vehicle from the instrument panel to a remote device to be controlled. As the conduit is routed in a curved or circuitous path through the vehicle with the conduit anchored to the vehicle support structure and the opposite ends of the core element connected to the input and output control members, it is necessary to either adjust the overall length or the conduit or the overall length of the core element to adjust the input and output control members to the proper positions relative to one another. It is also frequently necessary to support the conduit midway along its length with such supports being adjustable axially along the conduit for positioning for attachment to a fixed support structure. Various adjustment design philosophies are known in the prior art for accomplishing such adjustments in remote control assemblies; nevertheless, there is a constant need for a new design philosophy implementing a new combination of components in an adjustment mechanism for such a motion transmitting remote control assembly.

The periphery of the subject invention is, at least, in part defined by U.S. Pat. Nos. 3,781,908 to Tullos and 3,952,377 to Morell. The subject invention is a species of the generic invention of the above cited co-pending application.

SUMMARY OF THE INVENTION

A motion transmitting remote control assembly of the type for transmitting motion in a curved path by a motion transmitting core element movably supported by a conduit defining the longitudinal axis of the control assembly and an adjustment mechanism for adjusting the length of one of the conduit and the core element along the longitudinal axis. The adjustment mechanism includes a fitting member, opposed and radially outwardly tapered wedges disposed within the fitting member, and a pair of ramps normally in wedging engagement with the wedges for radial expansion into engagement with the fitting member to create radial binding forces between the wedges and the fitting member to prevent axial movement of the fitting member relative to the wedges along the longitudinal axis in an adjusted fixed position. The ramps are axially movable relative to the wedges to a release position for releasing the radial binding forces to allow the fitting member to be moved axially relative to the wedges along the longitudinal axis.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a longitudinal cross sectional view of a first embodiment of the invention for adjusting the length of the core element and taken along the vertical center line of the perspective view of FIG. 2 and showing the assembly in the adjusted fixed position;

FIG. 2 is an exploded perspective view of the embodiment of FIG. 1;

DETAILED DESCRIPTION OF THE PREFERRED EMBODIMENT

Figure 3:
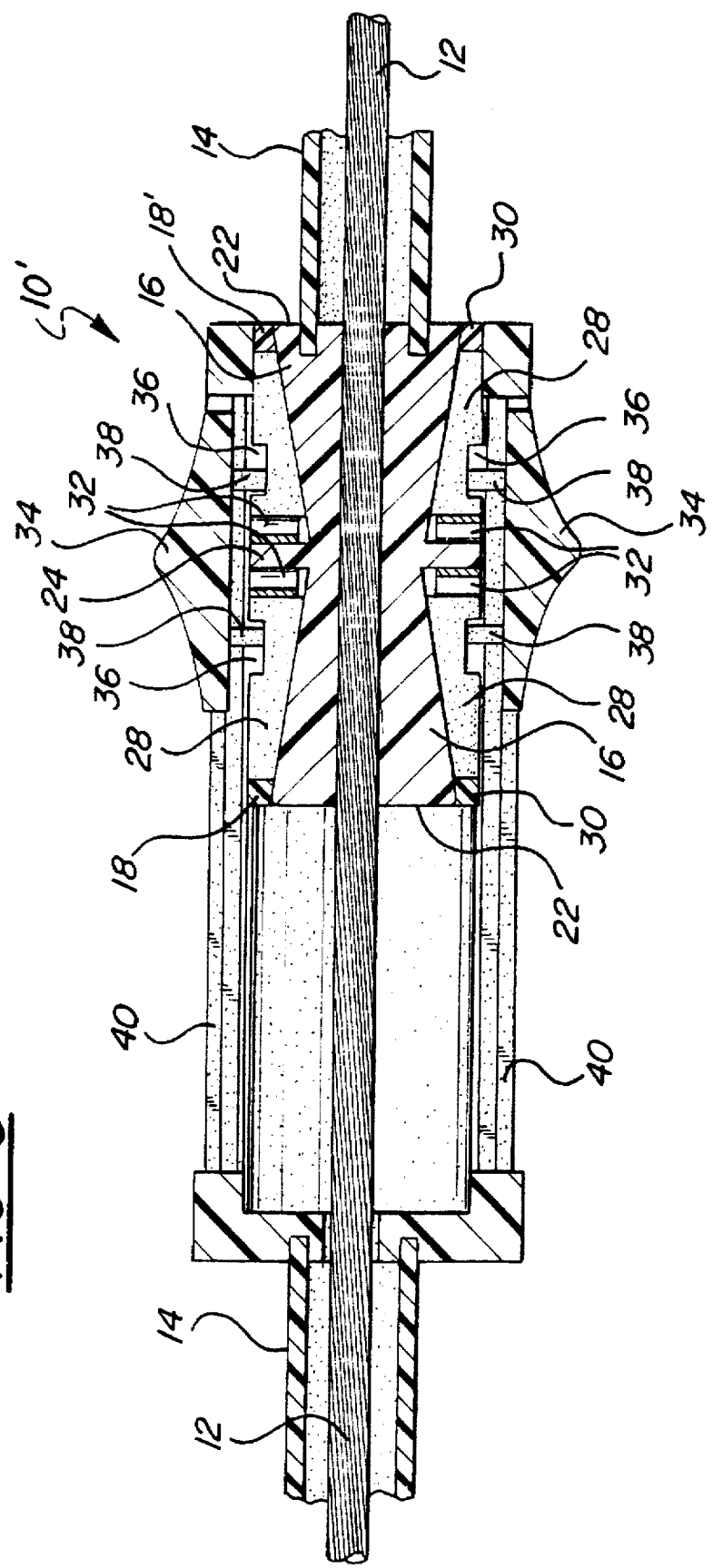
FIG. 3 is an enlarged cross sectional view similar to FIG. 1 in the adjusted fixed position but of a second embodiment of the invention for adjusting the length of the conduit.

Referring to the FIGURES, wherein like numerals reference like or corresponding parts throughout the several views, a motion transmitting remote control assembly is generally shown at 10 in FIGS. 1 and 2 and at 10' in FIG. 3. The motion transmitting remote control assembly 10, 10' is of the type for transmitting motion in a curved path by a motion transmitting core element 12 movably supported by a conduit 14 which defines the longitudinal axis of the control assembly. The conduit 14 may be of the well know variety comprising a plastic inner tubular member surrounded wires or filaments disposed on a long helical lead and encased in an extruded plastic casing. Normally, a ferrule or support fitting is molded about the end of the conduit and is adapted for connection to a support structure. The core element 12 typically comprises a wire or a stranded cable.

The remote control assembly 10, 10' includes an adjustment mechanism for adjustment along the longitudinal axis which generically includes opposed and radially outwardly tapered wedges defined by conical sections 16 and a pair of identical ramps 18 and 18' in engagement with the conical wedges 16. Each of the conical wedges 16 is paired with one of the ramps 18 or 18' for wedging action with the associated ramp 18 or 18' in response to an axial force applied to the paired one of the ramps 18 and 18' to create radial binding forces to prevent axial movement along the longitudinal axis in the direction of the applied axial force.

The conical wedge sections 16 extend from adjacent small diameter ends 20 in opposite directions to large diameter ends 22. The small diameter ends 20 of the conical sections 16 are connected together to prevent relative axial movement therebetween, i.e., the small diameter ends 20 of the conical sections 16 are integrally connected together by an integral flange section 24 to prevent relative axial movement therebetween.

The adjustment mechanism includes a tubular fitting member 26 and the opposed conical wedge sections 16 are disposed within the fitting member 26. In addition, the pair of ramps 18 and 18', which are normally in wedging engagement with the conical wedge sections 16, are movably supported in the fitting member 26 for radial expansion into engagement with the fitting member 26 to create radial binding forces between the conical wedge sections 16 and the fitting member 26 to prevent axial movement of the fitting member 26 relative to the conical wedge sections 16 along the longitudinal axis when in an adjusted fixed position. The ramps 18 and 18' are axially movable relative to the conical wedge sections 16 to a release position for releasing the radial binding forces to allow the fitting member 26 to be moved axially relative to the conical wedge sections along the longitudinal axis.

The ramps 18 and 18' are defined by a pair of spaced and independently axially movable collets with female conical surfaces in the collets. Each identical collet 18 and 18' includes longitudinally extending slots 28 extending thereinto from the inner or facing ends for allowing radial expansion and contraction of the respective collets 18 and 18'. The collets 18 and 18' have an endless annular section 30 at the outer ends which define the inner ends of the slots 28.

The flange 24 extends radially from the small diameter connection or ends 20 of the conical sections 16 and between the collets 18 and 18'. A biasing means, comprising a spring 32 between each of the collets and the central flange 24, is included for biasing the collets 18 and 18' into the wedging engagement. Each spring 32 comprises a circular wave spring disposed between the flange 24 and the inner end of each adjacent collet 18 or 18'.

The mechanism also includes a pair of manual release tabs 34 for moving the collets 18 and 18' axially out of the adjusted fixed position for adjusting the relative axial position between the fitting 26 and the conical sections 16. The release tabs 34 are connected to each collet 18 or 18' by a lost motion connection for moving one of the collets 18 or 18' axially out of the adjusted fixed position to apply a force against the flange 24 to move the conical sections 16 axially relative to the fitting 26 in one direction as the lost motion connection with the other collet 18 or 18' allows the other collet or 18' 18 to slip axially toward the flange 24 sufficiently to also move axially relative to the fitting 26 in the one direction. In the opposite direction, the tabs 34 move the other of the collets 18 or 18' axially out of the adjusted fixed position to apply a force against the flange 24 to move the conical sections 16 axially relative to the fitting in the opposite direction as the lost motion connection with the one collet 18 allows the one collet 18' to slip axially toward the flange 24 sufficiently to also move axially relative to the fitting 26 in the opposite direction and vise versa. Each release tab 34 is supported by the fitting 26 for axial movement therealong as the lost motion connection comprises an annular groove 36 in each of the collets 18 and 18' and posts 38 extending into the grooves 36 from the tabs 34. The grooves 36 are axially wider than the posts 38 for providing the axial lost motion. The tabs 34 are retained in axially extending guideways 40 in the fitting 26 by the posts 38 having hooks on the ends for underlying the guideways 40.

Figure 4:
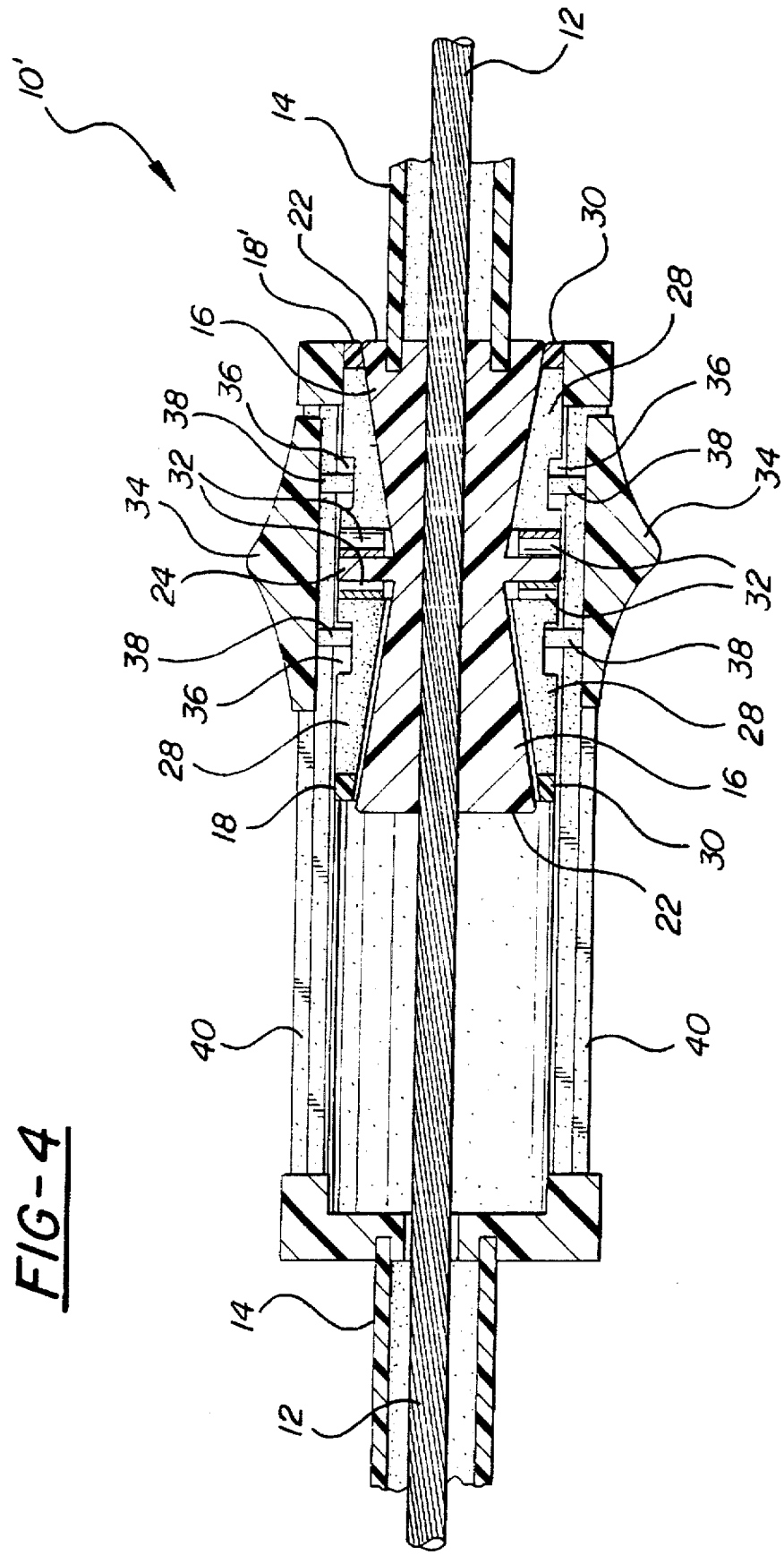
FIG. 4 is a cross sectional view the same as FIG. 3 but showing the assembly in a release position.

In the embodiment of FIGS. 1 and 2, the conical sections 16 are connected to the core element 12 and the fitting 26 includes means 42 for connection to a control member whereby the length of the core element may be adjusted. In the embodiment of FIG. 3, the conical sections 16 are connected to the conduit 14 and the core element 12 extends through a bore 44 in the conical sections whereby the length of the conduit 14 may be adjusted. FIG. 4 illustrates the release position as the tab 34 is shifted in one direction to engage the posts 38 at the ends of the grooves 36 to compress the spring 32 in that direction and to release the left collet 18 from gripping engagement between the fitting 26 and the associated conical wedge section 16. The friction between the other collet or right 18' and the fitting 26 will drag that other right collet 18' out of the gripping engagement so that the fitting may be adjusted to a new position axially relative to the conical sections 16. The same function occurs in the opposite direction with the operation of the collets 18 and 18' being reversed. The extent of the axial adjustment is limited by the tabs 34 engaging the ends of the guideways 40.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10, 10') comprising:

a conduit (14) defining the longitudinal axis of said control assembly;

a motion transmitting core element (12) movably supported by said conduit (14) along said longitudinal axis;

an adjustment mechanism for adjusting the length of one of said conduit (14) and said core element (12) along said longitudinal axis; said adjustment mechanism including a fitting member (26), opposed and radially outwardly tapered wedges (16) disposed within said fitting member (26), and a pair of ramps (18 and 18') normally in wedging engagement between said wedges (16) and said fitting member (26) in an adjusted fixed position, said ramps (18 and 18') being axially movable relative to said wedges (16) to a release position whereby said ramps (18 and 18') are radially expanded to create radial binding forces between said wedges (16) and said fitting member (26) in said adjusted fixed position to prevent axial movement of said fitting member (26) relative to said wedges (16) along said longitudinal axis and whereby said ramp (18 and 18') may be moved axially for releasing said radial binding forces to allow said fitting member (26) to be moved axially relative to said wedges (16) along said longitudinal axis.

2. An assembly as set forth in claim 1 wherein said wedges (16) comprise sections extending from adjacent small diameter ends (20) in opposite directions to large diameter ends (22).

3. An assembly as set forth in claim 2 wherein said small diameter ends (20) of sections (16) are connected together to prevent relative axial movement therebetween.

4. An assembly as set forth in claim 3 wherein each ramp (18 and 18') includes longitudinally extending slots (28) for allowing radial expansion and contraction thereof.

5. An assembly as set forth in claim 4 wherein said ramps (18 and 18') are defined by a pair of spaced and independently axially movable collets having female conical surfaces therein.

6. An assembly as set forth in claim 5 including biasing means or biasing said collets (18 and 18') into said wedging engagement.

7. An assembly as set forth in claim 6 including at least one manual release tab (34) for moving said collets (18 and 18') axially out of said adjusted fixed position for adjusting the relative axial position between said fitting member (26) and said conical sections (16).

8. An assembly as set forth in claim 7 including a flange (24) extending radially from said small diameter (20) connection of said conical sections (16) and between said collets (18 and 18'), said biasing means comprising a spring (32) between each of said collets (18 and 18') and said flange (24).

9. An assembly as set forth in claim 8 including a lost motion connection between each collet (18,18') and said release tab (34) whereby one of said collets (18 or 18') may be moved axially out of said adjusted fixed position to apply a force against said flange (24) to move said conical sections (16) axially relative to said fitting member (26) in one direction as said lost motion connection with the other collet (18 or 18') allows the other collet (18 or 18') to slip axially toward said flange (24) sufficiently to also move axially relative to said fitting member (26) in said one direction and for moving the other of said collets (18 or 18') axially out of said adjusted fixed position to apply a force against said flange (24) to move said conical sections (16) axially relative to said fitting member (26) in the opposite direction as said lost motion connection associated with said one collet (18 or 18') allows said one collet (18 or 18') to slip axially toward said flange (24) sufficiently to also move axially relative to said fitting member (26) in said opposite direction.

10. An assembly as set forth in claim 9 wherein said biasing means comprises a circular wave spring (32) disposed between said flange (24) and each adjacent collet (18 and 18').

11. An assembly as set forth in claim 10 wherein said release tab (34) is supported by said fitting member (26) for axial movement therealong, said lost motion connection comprises an annular groove (36) in each of said collets (18 and 18') and posts (38) extending into said grooves (36) from said tab (34), said grooves (36) being wider than said posts (38) for providing said lost motion.

12. An assembly as set forth in claim 11 wherein said sections (16) are conical and connected to said core element (12) and said fitting member (26) includes means (42) whereby the length of said core element (12) may be adjusted.

13. An assembly as set forth in claim 11 wherein said conical sections (16) are connected to said conduit (14) and said core element (12) extends through said conical sections (16) whereby the length of said conduit (14) may be adjusted.

\* \* \* \* \*